United States Patent
Dixon et al.

(10) Patent No.: US 9,473,369 B2
(45) Date of Patent: *Oct. 18, 2016

(54) APPLICATION TOPOLOGY BASED ON NETWORK TRAFFIC

(71) Applicant: International Business Machines Corporation, Armonk, NY (US)

(72) Inventors: Scot W. Dixon, Perth (AU); Mark N. Weatherill, Perth (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/852,904

(22) Filed: Sep. 14, 2015

(65) Prior Publication Data
US 2016/0087871 A1    Mar. 24, 2016

Related U.S. Application Data

(63) Continuation of application No. 14/490,803, filed on Sep. 19, 2014.

(51) Int. Cl.
*H04L 12/26* (2006.01)
*H04L 12/751* (2013.01)
(Continued)

(52) U.S. Cl.
CPC ............. *H04L 43/062* (2013.01); *H04L 43/04* (2013.01); *H04L 45/02* (2013.01); *H04L 45/72* (2013.01); *H04L 45/74* (2013.01); *H04L 67/30* (2013.01)

(58) Field of Classification Search
CPC ..... H04L 43/04; H04L 43/062; H04L 43/10; H04L 43/18; H04L 43/14; H04L 67/10; G06F 15/16; G06F 9/546; G06F 2209/547
See application file for complete search history.

(56) References Cited

U.S. PATENT DOCUMENTS 7,039,671 B2 * 5/2006 Cullen .................... H04L 29/06
                                                    709/201
7,352,762 B2 * 4/2008 T V ..................... H04L 67/1002
                                                    370/412

(Continued)

FOREIGN PATENT DOCUMENTS

EP      2709321 A1    3/2014

OTHER PUBLICATIONS

Azoff, "Solution Guide: Application Performance Management" OVUM, Solution Guide: Application Performance Management (0100127-071), © 0vum (Published Jul. 2012), Reference Code: 0100127-071, Publication Date: Jul. 2012, pp. 1-57.

(Continued)

*Primary Examiner* — Brian O'Connor
(74) *Attorney, Agent, or Firm* — Isaac J. Gooshaw (57) ABSTRACT

Methods and apparatuses for generating an application topology are provided. A processor determines a first application profile based, at least in part, on a first network packet. A processor determines a second application profile based, at least in part, on a second network packet. A processor determines a link between a first application and a second application based, at least in part, on address information of the first network packet. A processor generates a topology comprising the first and second application profiles based, at least in part, on the link, the first application profile and the second application profile. A processor updates the first and second application profiles based, at least in part, on matching the first application profile and second application profile with an application deployment template.

7 Claims, 5 Drawing Sheets

(51) Int. Cl.
  *H04L 12/721* (2013.01)
  *H04L 12/741* (2013.01)
  *H04L 29/08* (2006.01)

(56) References Cited

U.S. PATENT DOCUMENTS

| | | | |
|---|---|---|---|
| 7,395,195 B2 | 7/2008 | Suenbuel et al. | |
| 7,562,365 B2* | 7/2009 | Dinh | H04L 51/26 719/314 |
| 7,912,896 B2* | 3/2011 | Wolovitz | H04L 12/5895 709/203 |
| 7,930,396 B2* | 4/2011 | Trinon | G06Q 10/06 705/348 |
| 8,725,888 B2* | 5/2014 | Short | H04L 63/08 709/219 |
| 8,971,196 B2* | 3/2015 | Degioanni | H04L 67/1097 370/252 |
| 9,049,216 B2* | 6/2015 | McCanne | H04L 67/1097 |
| 9,077,611 B2* | 7/2015 | Cordray | H04L 41/0246 |
| 9,167,618 B2* | 10/2015 | Brisebois | H04W 76/046 |
| 2003/0058277 A1* | 3/2003 | Bowman-Amuah | G06F 17/30607 715/765 |
| 2004/0240458 A1* | 12/2004 | T V | H04L 67/1002 370/412 |
| 2005/0283759 A1 | 12/2005 | Peteanu et al. | |
| 2006/0092861 A1* | 5/2006 | Corday | H04L 67/34 370/256 |
| 2007/0130255 A1* | 6/2007 | Wolovitz | H04L 12/5895 709/204 |
| 2010/0161821 A1* | 6/2010 | Slamkovic | G06F 15/16 709/230 |
| 2011/0222619 A1* | 9/2011 | Ramamurthi | H04L 27/0008 375/267 |
| 2011/0295633 A1 | 12/2011 | Bird | |
| 2013/0019008 A1 | 1/2013 | Jorgenson et al. | |
| 2013/0070622 A1* | 3/2013 | Degioanni | H04L 67/1097 370/252 |
| 2015/0215376 A1* | 7/2015 | Kranz | G06F 9/45533 709/226 |
| 2016/0014842 A1* | 1/2016 | Brisebois | H04W 76/046 709/224 |

OTHER PUBLICATIONS

Cisco, White Paper "Software-Defined Networking: Why We Like It and How We Are Building on It", © 2013 Cisco and/or its affiliates, pp. 1-4.
Netscout, "nGeniusONE Unified Performance Management Platform", Copyright © 2013 NetScout Systems, Inc., pp. 1-11.
U.S. Appl. No. 14/490,803, filed Sep. 19, 2014, Entitled "Application Topology Based on Network Traffic".
Appendix P "List of IBM Patents or Patents Applications Treated as Related" filed Sep. 14, 2015, pp. 2.

* cited by examiner

APPLICATION TOPOLOGY BASED ON NETWORK TRAFFIC

BACKGROUND OF THE INVENTION

The present invention relates generally to the field of application performance management, and more particularly to analyzing network traffic.

An application topology is a map or diagram that shows the layout of applications used by various devices and servers of a network in an enterprise. An application topology shows how different applications are connected to one another and how they can be accessed by various computers and networks. The applications of an application topology can include applications running on dedicated devices or cloud applications running on a variety of devices. Application topologies provide network administrators a model to analyze the impact particular devices or servers of the network have on an application or group of applications.

SUMMARY

Embodiments of the present invention provide a method, system, and program product to generate an application topology. A processor determines a first application profile based, at least in part, on a first network packet. A processor determines a second application profile based, at least in part, on a second network packet. A processor determines a link between a first application and a second application based, at least in part, on address information of the first network packet. A processor generates a topology comprising the first and second application profiles based, at least in part, on the link, the first application profile and the second application profile. A processor updates the first and second application profiles based, at least in part, on matching the first application profile and second application profile with an application deployment template.

DETAILED DESCRIPTION

While solutions to generate application topologies are known, they require Deep Dive Component Monitoring (DDCM) software. DDCM is specialized monitoring software installed on each device or server of a network. Execution of the DDCM software impacts performance of the servers and the network as a whole. Furthermore, installing and updating DDCM software takes time to implement. As such, a roll-out of DDCM software is needed when servers are added, thereby taking time until monitoring the network can begin and subsequently analyzed. Finally, DDCM software requires compatibility with the various devices or servers of the network. As networks allow for a larger variety of devices and servers, such as mobile devices and cloud computing, maintaining this compatibility requires additional time and resources to implement.

Embodiments of the present invention recognize that by employing port spanning and mirroring techniques on various network devices, such as network gateways, routers and switches, network traffic can be gathered. The network traffic can be analyzed based on information (e.g. IP addresses, port numbers, application payloads) transmitted as packets through the network. Based on the network traffic and the content of packets, an application topology is generated. In addition, the network is compared to both predetermined and user made templates to generate an application topology. By analyzing network traffic and the information contained in the packets of the network traffic, embodiments of the present invention have a small impact on network resources. Furthermore, by comparing templates to network traffic, embodiments of the present invention can quickly determine application deployment patterns allowing for a fast turnaround.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
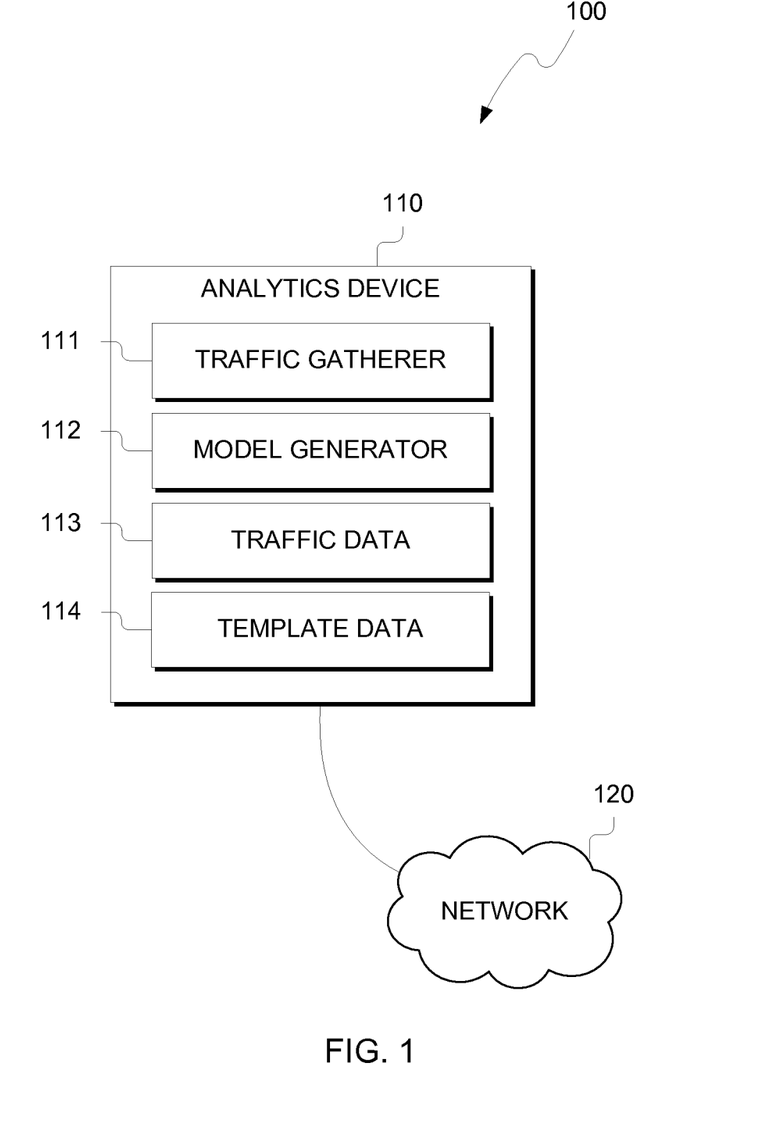
FIG. 1 is a functional block diagram illustrating an application monitoring environment, in accordance with an exemplary embodiment of the present invention.

The present invention will now be described in detail with reference to the Figures. FIG. 1 is a functional block diagram illustrating an application monitoring environment, generally designated 100, in accordance with one embodiment of the present invention. Application monitoring environment 100 includes analytics device 110 connected to network 120. Analytics device 110 includes traffic gatherer 111, model generator 112, traffic data 113 and template data 114.

In various embodiments of the present invention, analytics device 110 is a computing device that can be a standalone device, a server, a laptop computer, a tablet computer, a netbook computer, a personal computer (PC), a desktop computer, a network gateway, a network router or a network switch. In another embodiment, analytics device 110 represents a computing system utilizing clustered computers and components to act as a single pool of seamless resources. In general, analytics device 110 can be any computing device or a combination of devices with access to traffic data 113 and template data 114 and is capable of executing traffic gatherer 111 and model generator 112. Analytics device 110 may include internal and external hardware components, as depicted and described in further detail with respect to FIG. 5.

In this exemplary embodiment, traffic gatherer 111, model generator 112, traffic data 113 and template data 114 are stored on analytics device 110. However, in other embodiments, traffic gatherer 111, model generator 112, traffic data 113 and template data 114 may be stored externally and accessed through a communication network, such as network 120. Network 120 can be, for example, a local area network (LAN), a wide area network (WAN) such as the Internet, or a combination of the two, and may include wired, wireless, fiber optic or any other connection known in the art. In general, network 120 can be any combination of connections and protocols that will support communications between analytics device 110 and other devices (not shown) of network 120, in accordance with a desired embodiment of the present invention.

In various embodiments, network 120 includes various end devices, such as clients (e.g. PCs, laptops, mobile devices) and servers. Network 120 includes various networking devices, such as routers, gateways and switches, to facilitate communication between the end devices of network 120. An end device of network 120 sends and receives network packets to request services and information from other end devices of network 120. Networking devices of network 120 route the network packets through network 120 such that end devices are able to communicate with one another. A network packet is an encapsulated data structure based on layered models such as the TCP/IP model maintained by the Internet Engineering Task Force or the OSI model maintained by the International Organization for Standardization. Network packets include the information of the request, referred to as the payload, which an application of one end device wants to send to another end device. Network packets contain addressing information used to locate a device on a network (e.g., IP addresses for a source and destination). Network packets include information regarding the type of information the payload of the request contains, such as application protocols and port numbers. By analyzing the information contained in a network packet, various embodiments of the present invention infer a structure or topology of network 120. More specifically, by analyzing the various layers of network packets an application topology is inferred, mapping the various applications used by end devices of network 120 and the corresponding relationships of the applications.

In various embodiments, traffic gatherer 111 found on analytics device 110 receives network traffic information from one or more devices of network 120. The devices of network 120 send network packets, which said devices have sent or received, to traffic gatherer 111. For example, network switches of network 120 have hardware or software to perform port mirroring. Port mirroring sends network traffic from one port of the switch to a monitoring port or specific network address such as analytics device 110. In some embodiments, separate devices are installed at various points of network 120 to intercept and record network traffic. In other embodiments, software is installed and executed on one or more devices of network 120 to intercept and record traffic. In other embodiments, traffic gatherer 111 intercepts and records network traffic. Analytics device 110 may be installed on certain locations of network 120 to record network traffic. For example, analytics device 110 may be a network gateway recording inbound and outbound traffic to a network.

In various embodiments, traffic gatherer 111 receives network traffic information by a device of network 120 without modification, containing the entire network packet that was recorded. In other embodiments, traffic gatherer 111 receives partial network traffic information by a device of network 120. For example, source and destination IP addresses may be decoded from a network packet and sent as network traffic information. One of ordinary skill in the art will appreciate that any combination of information contained in a network packet may be selected (e.g., IP addresses, port numbers, layer protocols, application header/payload information, etc.) to be sent to traffic gatherer 111 of analytics device 110.

In various embodiments, traffic gatherer 111 stores the received network traffic information from one or more devices of network 120 in traffic data 113. In some embodiments, traffic data 113 is stored on analytics device 110. In other embodiments, traffic data 113 is stored on a database or other storage device (not shown). In various embodiments, traffic gatherer 111 parses the network traffic information and stores certain portions of the network traffic information in traffic data 113. For example, error correction or detection information of a network packet may be omitted from the stored network traffic information of traffic data 113 after decoding the network packet. As another example, the message portion of an email may be omitted from the stored network traffic information of traffic data 113. In some embodiments, the application layer's payload may contain information that can be used in determining a network's topology and, as such, is stored by traffic gatherer 111 in traffic data 113. For example, a user requests a service through a web server. The application protocol of the network packet for the request would be received as a HTTP or hypertext transfer protocol, however the payload of the request may contain information regarding the web service to be used, such as WSDL (web services description language) or WADL (web application description language). Traffic gatherer 111 includes such payload information for further analysis by model generator 112 to determine the application topology of network 120.

In various embodiments, traffic data 113 stores network traffic information from network packets sent and/or received from devices of network 120. In some embodiments, traffic data 113 may store the network packets without modification. In other embodiments, traffic data 113 may store network traffic information decoded from the network packets sent and/or received from devices of network 120. For example, the network packet's length is not stored in traffic data 113, while the source and destination IP addresses are stored in traffic data 113. Traffic data 113 stores a variety of network traffic information of the network packets traffic gatherer 111 receives. For example, traffic data 113 may store, but not limited to, the following information: source and destination MAC (Media Access Control) addresses, source and destination IP (Internet Protocol) addresses, IP Version (e.g., IPv4 or IPv6), Type of Service, packet identification number, IP Protocol, source and destination ports, sequence and acknowledgment numbers, and application payloads.

In various embodiments, model generator 112 determines an application topology of network 120 based on traffic data 113 and template data 114. An application topology of network 120 includes a diagram of applications executing on various devices of network 120. The diagram includes links and nodes, where a node is an instance of an application executing on one or more devices of network 120 and a link is a connection used by at least two applications to communicate with one another. Model generator 112 determines applications of the application topology based on traffic data 113. Model generator 112 evaluates traffic data 113 to determine an application executing on one or more devices of network 120. Model generator 112 determines the applications of the application topology based on address information (e.g., MAC addresses or IP addresses) of network packets stored in traffic data 113. Model generator 112 determines the links of the application topology based on source and destination pairs of address information of network packets stored in traffic data 113. For example, a network packet has a HTTP request for a web page to be received. Model generator 112 evaluates the application protocol of the network packet to determine that an HTTP request is present. Model generator 112 assigns an HTTP protocol to a traffic profile for an application based on the protocol being present in the network packet sent or received by a device. Due to the network packet indicating a request, model generator 112 determines the source address is a client and the destination address is a server. As such, model generator 112 determines the destination address is an HTTP server application and the source address is an HTTP client application. A traffic profile for an application includes network traffic information for an application of the application topology, as discussed above, as well as additional information regarding the application.

In various embodiments, model generator 112 stores additional information for an application of the application topology in a traffic profile. Model generator 112 gathers relevant network traffic information stored in traffic data 113 for a given application. Model generator 112 gathers port numbers represented by a network packet stored in traffic data 113 and assigns the source and destination port numbers to the respective source and destination applications based on IP addresses of the network packet. Model generator 112 gathers any protocol used in a network packet of traffic data 113 and assigns the protocols used by source and destination applications based on the protocols used. In one embodiment, model generator 112 gathers application payloads from a network packet and examines the payload for relevant information regarding the type of communication between a source and destination. An application payload is the part of the network packet meant for delivery to a particular device. For example, Simple Object Access Protocol (SOAP) is a standardized message format to provide web services in a network. A SOAP message can be sent through a variety of networking protocols such as HTTP or Simple Mail Transfer Protocol (SMTP). In either case, the message or application payload is more indicative to the type of communication than the protocols by themselves. In this example, model generator 112 examines the application payload and determines the type of communication to be a SOAP message, as opposed to the HTTP or SMTP message that is inferred from the port numbers and application protocol of the network packet.

In various embodiments, model generator 112 compares the template data 114 and traffic data 113 to determine if traffic data 113 matches a template stored in template data 114. Template data 114 stores one or more templates that represent known application deployment patterns in application monitoring environment 100. See FIG. 3 and the discussion below for a more detailed explanation of templates representing application deployments. Application deployments are groups of at least two applications that may be used in a network. A template stored in template data 114 includes an arrangement of one or more applications as nodes, respectively, in a network. A template also includes links between said nodes or applications. The template represents a known pattern of communication between various applications. In addition to the applications and links of the template, template data 114 also stores network traffic information. The network traffic information of a template includes protocols and port numbers used by application deployments represented by the template. Template data 114 stores identifiers or names (e.g., Web Services or Transaction Gateway) for applications represented as nodes in a template. Template data 114 stores rules as to how to handle specific application structures when making a comparison or applying a template. For example, a template may contain a rule that clients of a particular application be grouped and shown as a single application. Model generator 112 compares traffic data 113 to templates stored in template data 114. If a pattern of traffic data matches network traffic information stored in a template of template data 114, the model generator 112 assigns the identifiers or names of the matching template to the applications associated with matching traffic data of traffic data 113. Furthermore, template data 114 includes rules to apply to the application topology as a whole. For example, model generator 112 determines a rule should be applied to the application topology, where applications with the same IP address should be grouped together. For a given application of a template, template data 114 includes application profiles which describe the expected network traffic information, names and identifiers associated with certain types of network traffic information, and any applicable rules to be applied if a match is found.

In various embodiments, template data 114 includes predefined templates of well known or often used application deployments within application monitoring environment 100. The well known or often used application deployments are saved as predetermined templates in template data 114 for a user to select. In other embodiments, model generator 112 provides a user interface for generation of user made templates. A user defines an application deployment pattern as a template. The user defined template includes links and nodes for various applications in addition to port numbers and protocols used by the applications in the template. For an application in the template, the user defines an identifier or name to use for the applications of the template. Model generator 112 updates the names or identifiers of the application topology based on network traffic information stored in traffic data 113 matching a template for application deployment stored in template data 114. When a match is found, model generator 112 generates an application topology based on the matching template stored in template data 114.

Figure 2:
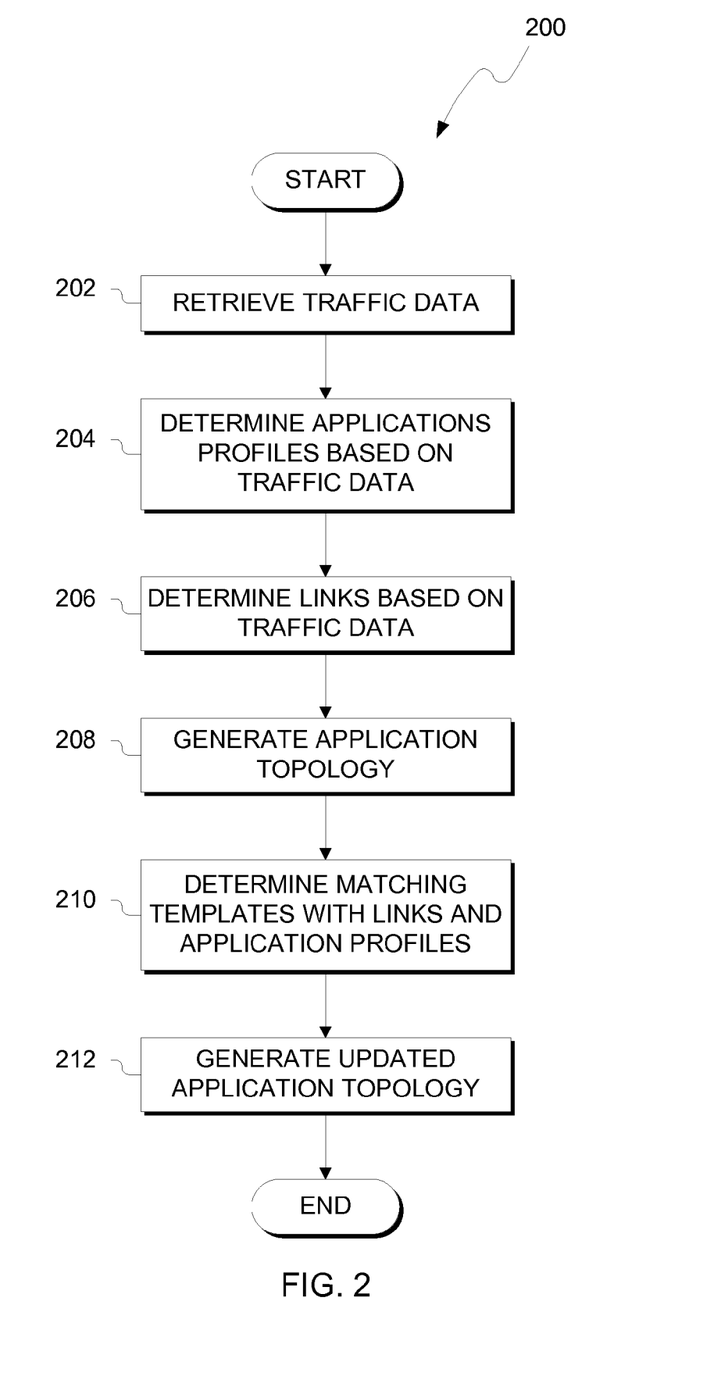
FIG. 2 illustrates operational processes of generating an application topology of a network, on a computing device within the environment of FIG. 1, in accordance with an exemplary embodiment of the present invention.

FIG. 2 is a flowchart illustrating operational processes, generally designated 200, of generating an application topology of network 120, on a computing device within the environment of FIG. 1, in accordance with an exemplary embodiment of the present invention.

In process 202, model generator 112 retrieves traffic data 113 including network traffic information of network packets sent and received by network 120. Traffic gatherer 111 collects network traffic as network packets and stores the information in traffic data 113. In some embodiments, traffic gatherer 111 receives network packets from switches, routers and gateways of network 120 through port mirroring. In other embodiments, traffic gatherer 111 intercepts and records network packets sent through network 120. Model generator 112 receives network traffic as stored in traffic data 113. In one embodiment, traffic data 113 stores only a partial amount of network traffic based on the received network traffic of traffic gatherer 111. In such an embodiment, traffic gather 111 may only receive network packets for certain periods of time (e.g., at peak times of load for network 120) or may only receive network packets for certain portions of network 120.

In process 204, model generator 112 determines traffic profiles of applications of network 120 based on network packets of traffic data 113. Model generator 112 evaluates traffic data 113 to determine the applications executing on devices of network 120. Model generator 112 determines devices of network 120 based on address information of network packets stored in traffic data. For example, IP addresses of network packets are used to identify devices. Network packets of traffic data 113 with the same IP address are determined to be sent from or by the same device, based on the respective source and destination IP address fields of the network packets. In some embodiments, MAC addresses are used to identify addresses. For example, in a network which uses DHCP (Dynamic Hosting Configuration Protocol) for device addressing, model generator 112 determines devices based on MAC addresses of the network packets. Model generator 112 retrieves application data associated with a device from network packets of traffic data 113. Model generator 112 determines application protocols and port numbers of network packets and stores the determined information as profiles for each device associated with the network packets. In some embodiments, model generator 112 includes other information to the traffic profiles of applications in the generated application topology. For example, model generator 112 stores application payload information in a traffic profile (e.g., XML (Extensible Markup Language) tags, script language, APIs (Application Programming Interfaces), etc.).

In process 206, model generator 112 determines links between applications of network 120. Model generator 112 determines links between applications based on source and destination pairs of address information for network packets stored in traffic data 113. For example, based on a source IP or MAC address of a network packet being associated with a first application and a destination IP or MAC address of a network packet associated with a second application as determined in process 204, model generator 112 determines a link between both devices. Based on determining a link between applications, model generator 112 generates links between a traffic profile associated with the first application and a traffic profile of the second application.

In process 208, model generator 112 generates an application topology based on the application profiles determined in process 204 and links between the application profiles determined in process 206. An application topology includes a diagram of applications executing on various devices of network 120. The diagram includes links and nodes, where a node is an instance of an application executing on one or more devices of network 120 and a link is a connection used by at least two applications to communicate with one another. Model generator 112 associates the application profiles to the nodes of the application topology for analysis and matching of application deployment structures in process 210.

In process 210, model generator 112 determines templates stored in template data 114 which match the determined links (process 206) and traffic profiles (process 204). Templates stored in template data 114 contain patterns of application deployments. The patterns can be either predefined application deployment patterns or user defined patterns. Model generator 112 compares the templates to portions of the application topology. For a given arrangement of a template, model generator 112 determines if a grouping of linked traffic profiles match the application profiles of the template. Model generator 112 compares the traffic profiles to application profiles of the template determined to match the deployment structure. If model generator 112 determines a match between the application profiles of the template and the traffic profiles of a portion of the application topology, then model generator 112 applies any names or identifiers used in the template along with applying any rules to the portion of the application topology determined to match the template.

In process 212, model generator 112 generates an updated application topology. Model generator 112 applies each portion of the application topology determined to match a template with names or identifiers based on templates that match a portion of the application topology. For example, an HTTP server executes an application determined to provide web services via JavaScript Object Notation. Model generator 112 gives the application the name "JSON Web Services" based on a name stored with the corresponding application of the matched template. Model generator 112 applies any rules associated with the template determined to match a portion of the application topology. For example, a rule states to group clients of the application topology into one group in order to remove clutter from the updated application template. For applications determined to be clients, model generator 112 groups the clients together and assigns a name, such as "Web Clients".

Figure 3:
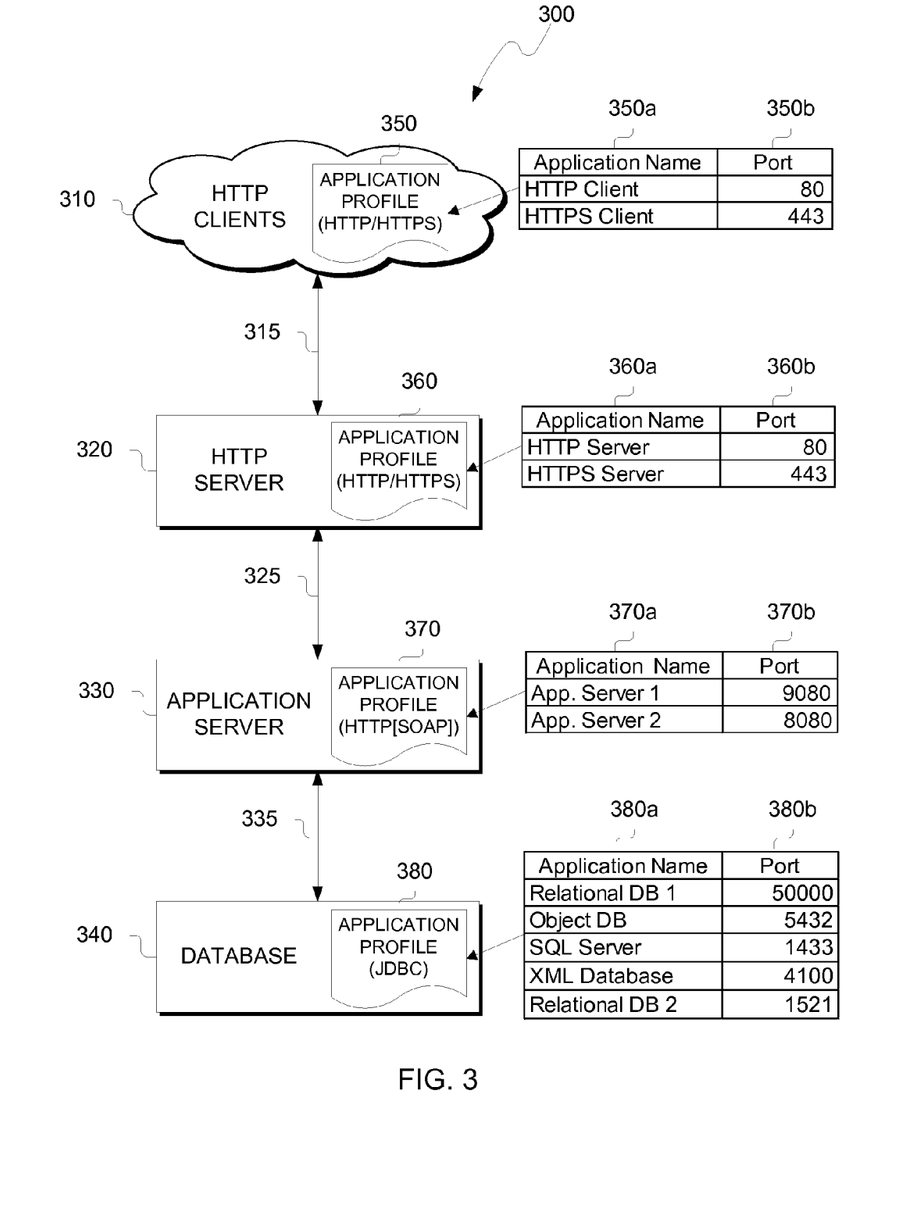
FIG. 3 illustrates an example application deployment template, in accordance with an exemplary embodiment of the present invention.

FIG. 3 illustrates an example application deployment template, generally designated 300, in accordance with an exemplary embodiment of the present invention.

In this example, application deployment template 300 includes applications 310, 320, 330 and 340 and links 315, 325 and 335 which define an application deployment structure. Application deployment template 300 represents a three-tiered web application service. Multiple HTTP clients (application 310) send requests to a HTTP server (application 320) for a web service as requests using the HTTP protocol. The HTTP server (application 320) sends the web service request to an application server (application 330). Application server (application 330) performs the request based on information retrieved from a database (application 340). Links 315, 325 and 335 define the expected communication paths of the application deployment structure represented by the template. Link 315 defines the communication path between HTTP clients (application 310) and HTTP Server (application 320). Link 325 defines the communication path between HTTP server (application 320) and application server (application 330). Link 335 defines the communication path between application server (application 330) and database (application 340).

For a given application, an application profile is defined. An application profile includes various types of network traffic information for which an application sends and/or receives. An application profile includes one or more application protocols, application names and port numbers associated with each application name. In this example, application deployment template 300 assigns application profiles 350, 360, 370 and 380 respectively to applications 310, 320, 330 and 340. Application profile 350 represents web traffic sent and received by HTTP clients (application 310). Application profile 350 includes two application names 350a with associated port numbers 350b. Application profile 350 includes two application names 350a, HTTP or HTTPS (Hypertext Transfer Protocol over Secure Socket Layer), based on the application types mapped to port numbers 350b, 80 and 443, respectively. Application profile 350 also includes a rule to group clients into a single representation if more than one client is found. Application profile 360 represents web traffic received from HTTP clients (application 310) by HTTP Server (application 320). Application profile 360 includes two application names 360a based on the HTTP or HTTPS application types mapped to port numbers 360b, 80 and 443, respectively. Application profile 370 represents web application requests from HTTP Server (application 320) to Application Server (application 330).

In this example, application profile 370 defines that the application requests are sent using the HTTP application protocol with an application payload using SOAP (Simple Object Access Protocol). When matching the application profile, model generator 112 analyzes the payload of the HTTP request to determine if the request contains SOAP formatting in the request message. Application profile 370 includes known SOAP message structures to determine if the HTTP request to Application Server (application 330) includes a SOAP message in the application's payload. For example, application profile 370 includes example XML that may be used in the request sent to Application Server (application 330). Application profile 370 includes a mapping of application names 370a of two applications used to perform application server requests mapped to port number 370b associated with the two applications. Application profile 380 defines database queries received by database (application 340) to perform the requested application services by application server (application 330). Application profile 380 defines the traffic received by database (application 340) to use JDBC (Java Database Connectivity) as an application protocol. Application profile 380 includes application names 380*a* for five applications with respective port numbers 380*b* for the applications. Applications names 380*a* and port numbers 380*b* represent a group of applications which provide services for a database (e.g., query or retrieval of data).

Model generator 112 compares the deployment structure (e.g., the applications and the respective links) of the template to portions of application topology of network 120. Upon matching a portion of the application topology, the application profiles of the application deployment template are compared to traffic sent or received by the corresponding applications of network 120. If a match is determined based on the above comparison, then model generator 112 updates the application topology with the application names which match the port numbers found in traffic data to match the template. In this example, if a JDBC request is found to have port number 1433 as part of the respective traffic data to a database application, then the database in the updated application topology is renamed to be a "SQL Server", as indicated in application profile 380. Furthermore if a match is determined based on the above comparison, then model generator 112 applies any rules associated with an application profile. For example, application profile 350 includes a rule to group client applications as a single grouping in the application topology. Model generator 112 groups client applications associated with IP addresses indicated as source IP addresses in traffic data sent to a server. Model generator 112 also groups client applications based on a predetermined number of applications sending a similar request or type of network traffic.

In some embodiments, application profiles include application name(s) and port number(s) for traffic sent or received by an application. In other embodiments, application profiles include application name(s) and port number(s) for traffic both sent and received by an application. In some embodiments, model generator 112 determines multiple applications for a device based on network traffic. Model generator 112 groups the applications and assigns a name to the grouping. For example, if multiple clients are found with similar applications, then model generator 112 groups the clients based on a name determined by a subnet the clients reside on, a geographic location, a work group or division of an enterprise. If a group of applications are found to be executing on a device or cluster of devices, then model generator 112 groups the application and assigns a name such as "Mainframe", "Cloud" or a user defined name. The groupings of applications are stored as rules associated with application profiles with applications to be grouped.

Figure 4:
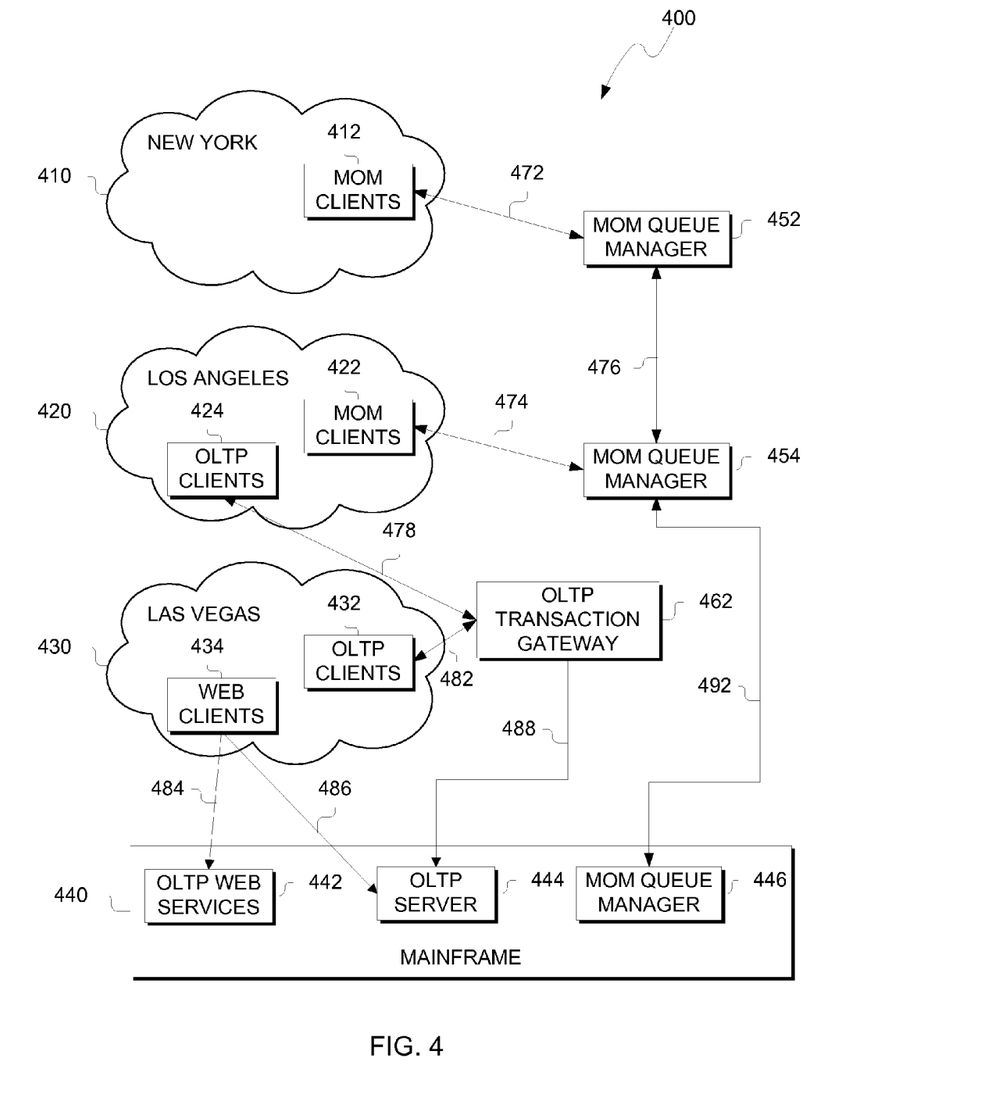
FIG. 4 illustrates an example application topology, in accordance with an exemplary embodiment of the present invention.

FIG. 4 illustrates an example application topology, generally designated 400, in accordance with an exemplary embodiment of the present invention.

In various embodiments, model generator 112 presents application topology 400 to users in a graphical user interface or GUI. The GUI presents the various application profiles and links between the application profiles as determined by model generator 112. The application topology presented by GUI also includes any updated application profiles including names or identifiers of applicable application deployment templates stored in template data 114 that match the application profiles determined by model generator 112. In some embodiments, a user hovers over or selects an application of the application topology 400 and network traffic information regarding the application is presented. For example, port numbers or application protocols of an application profile are presented when an application is selected.

In this example, application topology 400 includes groupings 410, 420, 430 and 440; applications 412, 422, 424, 432, 434, 442, 444, 446, 452, 454 and 462; and links 472, 474, 476, 478, 482, 484, 486, 488 and 492. Groupings 410, 420, 430 and 440 are groupings of applications based on rules associated with application profiles of an application stored in a template. Applications 412, 422, 424, 432, 434, 442, 444, 446, 452, 454 and 462 are applications determined to be executing on a network by model generator 112 based on traffic data 113 and have been updated based on matching application deployment templates stored in template data 114. Links 472, 474, 476, 478, 482, 484, 486, 488 and 492 are communication paths between groupings and applications determined by model generator 112 based on traffic data 113.

Three templates are stored in template data 114 (not shown). A first template defines an application deployment structure for a MOM (Message-Orientated Middleware) solution for handling requests in a distributed solution. A MOM system includes clients and queue managers to receive and distribute the messages to other clients. An application profile for the MOM queue managers would match traffic with particular protocols (e.g. AMQP, or Advanced Message Queuing Protocol) or through application payloads with particular APIs (e.g., SOAP). The application profile includes port numbers associated with the applications. In this example, the MOM queue managers have receiving ports, which receive messages to distribute from clients, and listener ports, which the MOM queue managers use to coordinate delivery of a message. By comparing which port is used, a connection can be inferred without analyzing the traffic of the source or destination device of the network traffic. In the example application topology 400, the first template is matched to applications 412, 422, 452, 454 and 446. Links 472, 474, 476 and 492 are determined based on address information of network traffic.

The second template defines an application deployment structure for an OLTP (online transaction processing system), where requests to perform an operation are collected and performed by a server either in batches or real-time. A transaction for processing is sent from a client to a transaction gateway. The transaction gateway receives transactions in a variety of protocols (e.g., SOAP) and application payloads (e.g. XML and APIs). In this particular example template, it should be noted that web clients and their associated protocols and port numbers are not included in this template. The transaction gateway sends requests to a transaction server to perform the operation contained in the request. The gateway and server communicate using a different port number than the clients. In the example application topology 400, the second template is matched to applications 424, 432, 462 and 444. Links 478, 482 and 488 are determined based on address information of network traffic.

The third template defines an application deployment structure for an OLTP used by web clients. In this template the web clients connect directly to the transaction server, however the application profile only includes the port number for web clients. The third template also includes a web services transaction server as a dedicated web server for transactions to be performed. In this example template, a user has created a template solely for transactions performed as web services to monitor the performance of this portion of the transaction system. A user also edited the second template to exclude web services and isolate the monitoring of the web services provided by the OLTP system. In the example application topology 400, the third template is matched to applications 434, 442 and 444. Links 484 and 486 are determined based on address information of network traffic. It should be noted that since web traffic uses a different application profile (e.g., HTTP protocol via port 8080), a separate link (i.e. 486) is created from the clients to the transaction server (application 444).

Once the templates have been matched, model generator 112 applies any rules to create groupings of applications. In this example each template has a rule to group client applications based on similar geographic locations. Grouping 410, 420 and 430 are determined based on more than one client application matching a portion of a template in addition to the respective client applications of the groupings 410, 420 and 430 residing in a particular geographic location. Grouping names can be determined based on rules defined by the user. For example, a user may specify a range of IP addresses associated with a particular location. As another example, model generator 112 may automatically determine a geographic location based on the IP address (e.g., a geolocation service). In example application topology 400, MOM Clients (applications 412 and 422) have been determined to be used at the New York, grouping 410, location (application 412) and the Los Angeles, grouping 420, location (application 422). Los Angeles, grouping 420, also includes OLTP Clients (application 424). Applications 422 and 424 are kept separate within grouping 420 since both have different traffic profiles and are therefore matched to separate application profiles. In example application topology 400, another rule to group applications is applied. The second rule instructs that applications with the same IP addresses should be grouped together. Model generator 112 evaluates application profiles for each application of the application topology and groups applications with the same IP address together. In example application topology 400, applications 442, 444 and 446 are grouped together based on the determination by model generator 112 that applications 442, 444 and 446 have the same IP address based on network traffic data.

Figure 5:
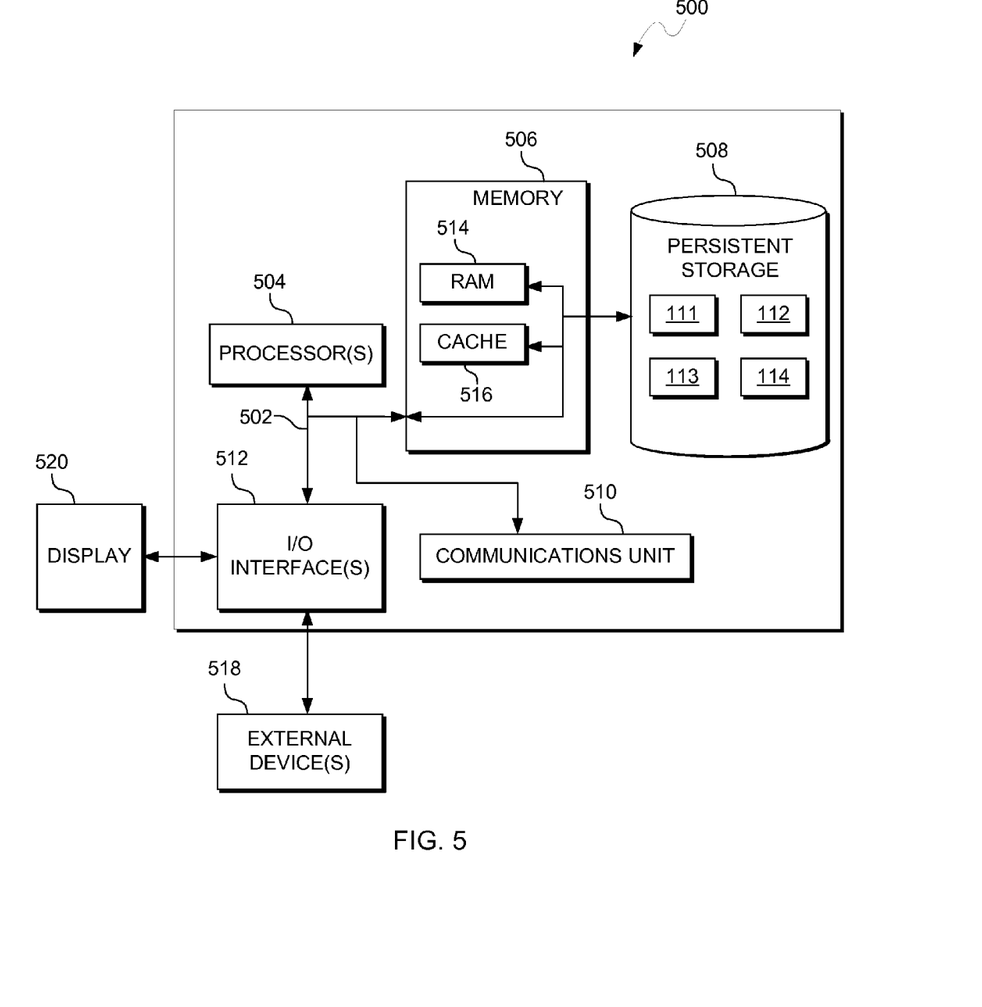
FIG. 5 depicts a block diagram of components of an analytics device executing the operational processes of FIG. 2, in accordance with an exemplary embodiment of the present invention.

FIG. 5 depicts a block diagram, 500, of components of analytics device 110, executing the operational processes of FIG. 2, in accordance with an exemplary embodiment of the present invention.

It should be appreciated that FIG. 5 provides only an illustration of one implementation and does not imply any limitations with regard to the environments in which different embodiments may be implemented. Many modifications to the depicted environment may be made.

Analytics device 110 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

Traffic gatherer 111, model generator 112, traffic data 113 and template data 114 are stored in persistent storage 508 for execution and/or access by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including resources of network 120. In these examples, communications unit 510 includes one or more network interface cards. Communications unit 510 may provide communications through the use of either or both physical and wireless communications links. Traffic gatherer 111, model generator 112, traffic data 113 and template data 114 may be, respectively, downloaded to persistent storage 508 through communications unit 510.

I/O interface(s) 512 allows for input and output of data with other devices that may be connected to analytics device 110. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., Traffic gatherer 111, model generator 112, traffic data 113 and template data 114 can be, respectively, stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) "Smalltalk" and "Java" the like may be subject to trademark rights in various jurisdictions throughout the world and are used here only in reference to the products or services properly denominated by the marks to the extent that such trademark rights may exist.

What is claimed is:

1. A method of generating an application topology, the method comprising:
 determining, by one or more processors, a first application profile based, at least in part, on a first network packet;

determining, by the one or more processors, a second application profile based, at least in part, on a second network packet;

determining, by the one or more processors, a link between a first application and a second application based, at least in part, on address information of the first network packet;

generating, by the one or more processors, a topology comprising the first and second application profiles based, at least in part, on the link, the first application profile and the second application profile; and updating, by the one or more processors, the first and second application profiles based, at least in part, on matching the first application profile and second application profile with an application deployment template.

2. The method of claim 1, wherein the first application profile and second application profile comprise a protocol of the respective first network packet and second network packet.

3. The method of claim 1, wherein the first application profile and second application profile comprise a port number of the respective first network packet and second network packet.

4. The method of claim 1, wherein the first application profile and second application profile comprise an application payload of the respective first network packet and second network packet.

5. The method of claim 1, wherein the address information comprises a source address and a destination IP address of the first network packet.

6. The method of claim 1, wherein the application deployment template comprises one or more protocols, port numbers or application payloads of a predetermined network traffic pattern.

7. The method of claim 1, wherein the application deployment template comprises one or more protocols, port numbers or application payloads of a user defined network traffic pattern.

* * * * *